(12) United States Patent
Stout et al.

(10) Patent No.: US 8,859,037 B2
(45) Date of Patent: Oct. 14, 2014

(54) METHOD FOR MANUFACTURING CERAMIC MATRIX COMPOSITE STRUCTURES

(75) Inventors: Jeffrey B. Stout, Simi Valley, CA (US); Gerard D. Pelletier, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 2493 days.

(21) Appl. No.: 11/034,134

(22) Filed: Jan. 12, 2005

(65) Prior Publication Data

US 2010/0003402 A1 Jan. 7, 2010

(51) Int. Cl.
  *B05D 7/00* (2006.01)
(52) U.S. Cl.
  USPC .......................................................... 427/229
(58) Field of Classification Search
  USPC .......................................................... 427/228
  See application file for complete search history.

(56) References Cited

U.S. PATENT DOCUMENTS

| | | | |
|---|---|---|---|
| 4,814,223 A * | 3/1989 | Tiba et al. ...................... | 442/281 |
| 4,983,451 A * | 1/1991 | Sugino et al. .................. | 442/388 |
| 5,133,993 A * | 7/1992 | Streckert et al. .............. | 427/226 |
| 5,173,367 A | 12/1992 | Liimatta et al. | |
| 5,438,025 A | 8/1995 | Leung et al. | |
| 5,521,008 A * | 5/1996 | Lieberman et al. ............ | 428/367 |
| 5,523,035 A * | 6/1996 | Sohda et al. ................... | 264/29.6 |
| 6,451,377 B1 | 9/2002 | Paul et al. | |
| 6,735,842 B1 * | 5/2004 | Wildenrotter et al. ........ | 29/525.01 |
| 2002/0166503 A1 * | 11/2002 | Magras et al. ................. | 117/100 |
| 2003/0137084 A1 * | 7/2003 | Kohyama et al. .............. | 264/625 |
| 2003/0145934 A1 * | 8/2003 | Tani ............................. | 156/89.11 |
| 2003/0162647 A1 * | 8/2003 | Muhlratzer .................... | 501/95.2 |

FOREIGN PATENT DOCUMENTS

EP 0 623 571 11/1994

OTHER PUBLICATIONS

Haug et al., DE 4016052 (Machine Translation), 1991.*
Allahverdi M. et al., Active/inactive fillers for Blackgas/Nextel 312 (BN) Composites, pp. 221-229.

* cited by examiner

Primary Examiner — Robert Vetere
(74) Attorney, Agent, or Firm — Haynes and Boone, LLP

(57) ABSTRACT

Methods are disclosed herein to fabricate high-strength ceramic matrix composite (CMC) structures by combining, in one example, pre-impregnated (prepreg) material with a pre-ceramic polymer. The prepreg is processed to a first density, and the densification is completed with repeated polymer infiltration and pyrolysis (PIP) cycles of the pre-ceramic polymer to fabricate a CMC structure. Advantageously, the present invention allows for fabrication of ceramic matrix composites more efficiently and to a larger scale than previously available.

20 Claims, 1 Drawing Sheet

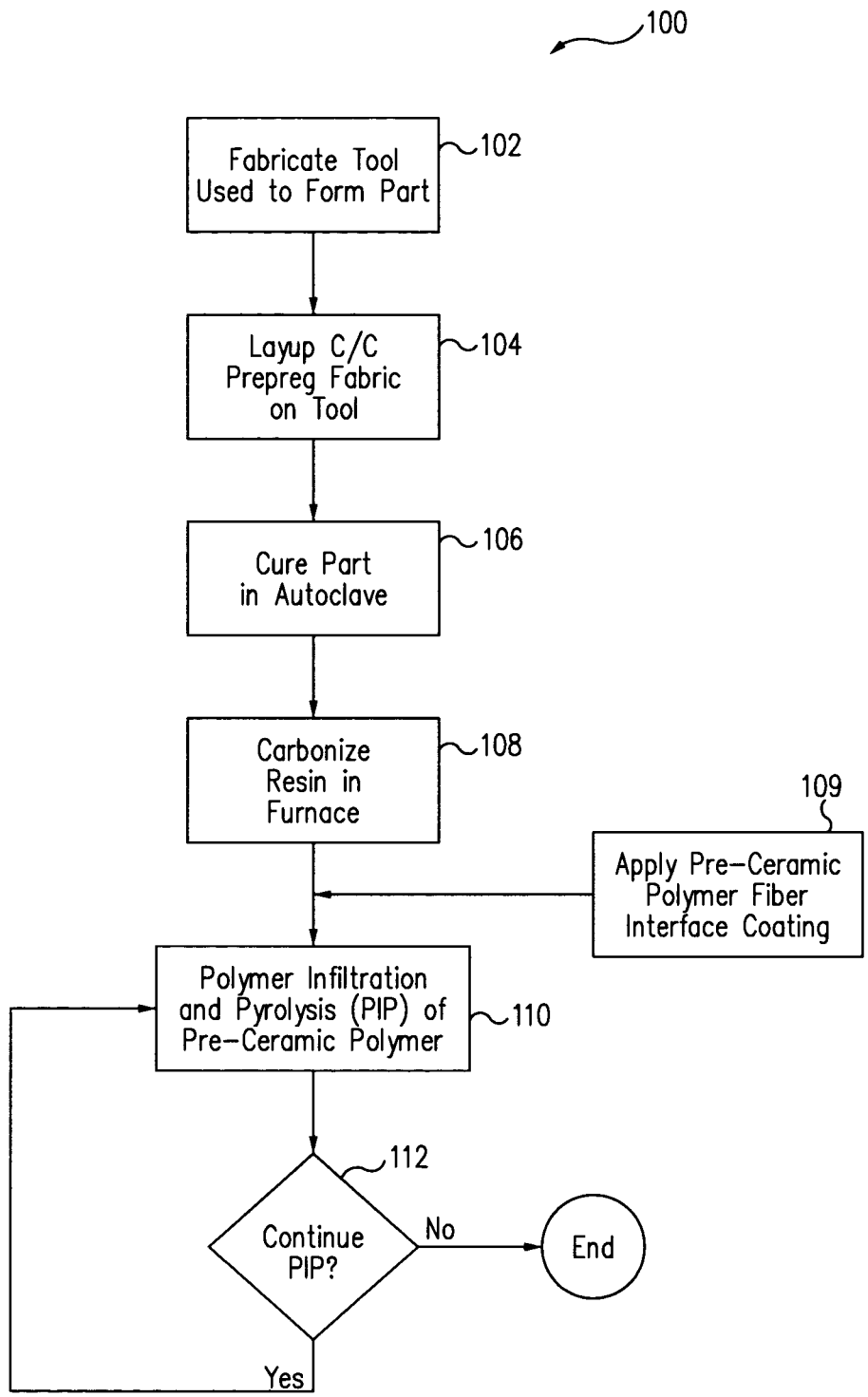

METHOD FOR MANUFACTURING CERAMIC MATRIX COMPOSITE STRUCTURES

TECHNICAL FIELD

The present invention relates generally to manufacturing composite structures and, more particularly, to manufacturing fiber reinforced ceramic matrix composite (CMC) structures.

BACKGROUND

Ceramic materials have long been recognized as superior materials for applications where attributes such as hardness and stiffness, strength and oxidation resistance at elevated temperatures, high thermal conductivity, low coefficient of thermal expansion, and resistance to wear and abrasion are of primary value. Structural applications of conventional monolithic ceramics have generally been limited due to the materials' brittle nature and low toughness. Such characteristics are markedly improved by reinforcement of the monolithic ceramics, e.g., by creating tougher fiber reinforced ceramics. Thus, fiber reinforced ceramic matrix composite (CMC) systems are of major interest to the high-temperature user community including the aerospace industry.

In one common form, carbon fibers are embedded in a silicon carbide matrix to create a carbon/silicon carbide composite system commonly referred to as C/SiC (typical nomenclature references the reinforcement first followed by the matrix). In order for a CMC system, such as C/SiC, to provide the requisite toughness, a fiber/matrix interface is typically required. This interface provides a weak bond between the fibers and the matrix and allows limited frictional fiber slippage, which provides toughness, and a crack deflection path around, rather than through, the fiber, further enhancing the toughness.

Typically, C/SiC composites have their interface and matrix created with a costly chemical vapor deposition (CVD) process. This process involves CVD reactors, which are complex chemical reactors that are expensive to build, maintain and operate. CVD reactors also tend to be specific to the application for which they were originally built; and, as applications have increased in size, large C/SiC parts have been built by fabricating and joining smaller sub-sections into the larger part. Furthermore, processing time in a CVD reactor to produce parts having acceptable structural thickness and density is usually lengthy. Also, the cost of running a CVD reactor tends to be significantly higher than the cost of running conventional furnaces, such as inert atmosphere furnaces. Accordingly, the use of CVD reactors has hindered the acceptance of large C/SiC structures due to the lengthy processing times and high costs.

As a result, there is a need for an efficient process for fabricating CMC (e.g., C/SiC) structures with shorter processing time, lower cost, and enhanced scale-up capabilities, and which produces parts with sufficient strength to withstand high loads and temperatures particularly, but not solely, in environments, such as combustion environments that are oxidizing relative to both the carbon reinforcement fibers and the non-oxide matrix.

SUMMARY

Methods are disclosed herein to fabricate high-strength ceramic matrix composite (CMC) structures with improved efficiency and scale-up capabilities. For example, in accordance with one embodiment of the present invention, a process for fabricating a C/SiC material system is disclosed that combines pre-impregnated (prepreg) carbon/carbon (C/C) material with a pre-ceramic polymer, which is processed by polymer infiltration and pyrolysis to produce a SiC-matrix for the fabrication of cost-effective C/SiC structures. No special interface is required because the starting structure, or prepreg, is fundamentally a C/C system which does not require a separate fiber/matrix interface. While the example is for a SiC matrix system, this process is applicable to various pre-ceramic polymers that could produce other matrix chemistries, such as but not limited to, amorphous variations of Si—O—N—C, HfC, mixtures of SiC and HfC, etc.

More specifically, in accordance with one embodiment of the present invention, a method of fabricating a ceramic matrix composite structure includes laying-up a prepreg fabric on a tool, curing the prepreg fabric, carbonizing the prepreg fabric, applying a pre-ceramic polymer to the carbonized prepreg fabric, and pyrolyzing the applied pre-ceramic polymer to fabricate a ceramic matrix composite structure.

In accordance with another embodiment of the present invention, a method of fabricating a ceramic matrix composite structure includes laying-up a carbon/carbon (C/C) prepreg fabric on a tool, curing the C/C prepreg fabric, carbonizing the C/C prepreg fabric to have a first density, and cycling through the operations of applying and pyrolyzing the pre-ceramic polymer to fabricate a C/SiC structure having a second density higher than the first density.

In accordance with yet another embodiment of the present invention, a method of fabricating a ceramic matrix composite structure includes curing (i.e., cross-linking) the C/C prepreg fabric in an autoclave, carbonizing the C/C prepreg fabric to a first density in an inert atmosphere furnace, applying a pre-ceramic polymer fiber interface coating to the carbonized C/C prepreg fabric, and cycling through the operations of applying and pyrolyzing the pre-ceramic polymer to fabricate a C/SiC structure having a second density higher than the first density.

Advantageously, the present invention allows for the fabrication of larger complex CMC structures, without a discretely processed fiber/matrix interface, with less costly equipment and shorter cycle times, thereby improving process efficiency. Scale-up capabilities are improved by utilizing large furnaces and not requiring the use of CVD reactors.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 1 shows a flowchart illustrating a process for fabricating CMC structures in accordance with an embodiment of the present invention.

Embodiments of the present invention and their advantages are best understood by referring to the detailed description that follows. It should be appreciated that like reference numerals are used to identify like elements illustrated in one or more of the figures.

DETAILED DESCRIPTION

In one embodiment, the present invention relates to manufacturing fiber reinforced ceramic matrix composite (CMC)

structures. Ceramic matrix composites as used in this document include composite materials comprising any of the various refractory carbides, nitrides and borides, such as, but not limited to, SiC, HfC, $Si_3N_4$, ZrC, $HfB_2$, etc., and non-stoichiometric combinations such as Si—C—N, etc., as the matrix. The composite structure would comprise both a reinforcement phase, such as, but not limited to C or SiC fibers, or discontinuous reinforcements, and the aforementioned ceramic matrices.

In accordance with an embodiment of the present invention, a carbon/silicon carbide (C/SiC) material system is disclosed that combines pre-impregnated (prepreg) carbon/carbon (C/C) material with SiC pre-ceramic polymer. The C/C prepreg is processed to a first carbonization density, and the densification is completed with subsequent infiltration and pyrolysis cycles of the SiC pre-ceramic polymer. Such a hybrid process for producing C/SiC structures has not been previously demonstrated in the industry to produce material with adequate strength. Advantageously, the present invention allows for fabrication of high-strength C/SiC parts more efficiently and to a larger scale than previously available.

FIG. 1 shows a flowchart illustrating a process 100 for fabricating C/SiC structures in accordance with an embodiment of the present invention.

A first operation 102 includes building a mold or tooling that will be used to form the final part. Typical methods may be used to build the tooling. The tooling should be made of material that can withstand the pressures and temperatures appropriate for an autoclave. In one experiment, flat plates of aluminum were used for the tooling, with the part removed from the tooling after operation 106. In another experiment, graphite tooling was used, with the part removed from the tooling after operation 108.

Prepreg C/C material is then laid-up on the tooling to a desired thickness, as shown in operation 104. In one example, the prepreg C/C material may be carbon fibers woven into fabric, which is then heat treated and soaked in a special resin. The resin should be designed to have a high yield of carbon solids (e.g., char, carbon black, carbon nano-tubes and/or carbon nano-spheres) either by carbonization or by addition, and may also include oxidation inhibitors such as boron carbide, boron nitride, etc. Advantageously, the resin also provides good tackiness for ease of lay-up. It will be apparent that the prepreg material may be manufactured to have various widths and dimensions and include various concentrations of resin.

Applicable prepreg material is commercially available in several forms from different vendors, including but not limited to the CC139 carbon composite material from HITCO Carbon Composites, Inc. ("HITCO") of Gardena, Calif. The CC139 composite material, in its fully dense C/C condition, is also known by its trade name, Semicarb® and is manufactured by a production-quality process for the semiconductor industry. The CC139 material is formed as a resin-filled fabric that is an 8 harness satin weave of T300 carbon fibers in 3k tows. The fabric is heat stabilized. The resin is a phenolic that is designed to have a high yield of carbon solids (char and carbon black) when carbonized in a furnace. The resin has good tackiness that is useful during lay-up. The resin also "B-stages" or secondarily reacts into a hard epoxy-like polymer at temperatures below 400° F. This attribute advantageously allows for the use of vacuum bag tooling and an autoclave to form and harden the parts. In one experiment, the CC139 prepreg material was cut into squares and laid-up on the flat plates of aluminum tooling with 12 layers per plate.

In operation 106, the tooling and prepreg material thereon are cured in an autoclave. In one example, the layers of fabric may be compressed by vacuum bags, gas pressure within the autoclave, or a combination of both. Vacuum bags and gas pressure may not only be used to compress the composite layers but to remove air/voids trapped in the matrix and to pull the fabric toward the tooling. Optionally, the tooling may be removed from the cured layers of fabric. If the tooling is to remain in place during subsequent processing, the tooling should be capable of withstanding high temperatures and have a similar coefficient of thermal expansion.

In one experiment, with no intent to limit the invention thereby, Mylar® sheets and vacuum bagging were applied during curing operation 106. The prepreg fabric and tooling were placed in an autoclave under about 90 psig pressure at a temperature of about 400° F. for about four hours of time. 90 psig pressure was selected to compact the layers of fabric. It is noted that the CC139 material may be put in the autoclave at different pressures in order to achieve different fiber volume fractions, where fiber volume fraction is defined as the percentage of total component volume that is occupied by the fibrous reinforcement. Fiber volume fraction may also be manipulated by changing the amount of resin in the prepreg material. For example, increasing the amount of resin in the prepreg material and lowering the autoclave pressure will reduce the fiber volume fraction. When cured, the part may resemble an epoxy-based polymer matrix composite. It will be apparent that the curing operation may occur at different pressures, temperatures, and lengths of time than those noted above depending on various factors, including but not limited to the autoclave design, curing environment, part specification, and prepreg material used.

In operation 108, after the part is cured, the resin in the prepreg fabric is heated to remove organic molecules from the resin and in this example, to leave two materials: resin char and carbon black. Additives, such as carbon nano-tubes and other carbon nano-structures may also be incorporated within the char. In one example, with no intent to limit the invention thereby, the vacuum bagging may be removed from the part after the curing operation 106, and the part may be placed on furnace supports. The cured prepreg fabric is then carbonized in a high-temperature inert atmosphere furnace or vacuum, using standard industry practices. The matrix of the prepreg fabric will become mainly carbon char and the part will obtain a first density of between about 60% and about 75% of the final component density. After carbonization, the part is rigid and somewhat fragile.

In accordance with an embodiment of the present invention, a pre-ceramic polymer fiber interface coating with low viscosity may be optionally coated on the fibers and carbon particles of the carbonized part and the interface coating pyrolyzed in a high-temperature furnace, as shown in optional operation 109. Advantageously, the pre-ceramic polymer fiber interface coating may wick into all the pores, fill voids, and protect the carbon fibers during subsequent high temperature processing. The interface coating may be applied by various methods, including but not limited to dip, paint-on, and spray methods. The interface coating operation may be repeated or not performed. In one example, with no intent to limit the invention thereby, a polymer-derived SiC fiber interface coating may be used, such as the LT33-74A available from Starfire Systems, Inc. of Malta, N.Y.

In one experiment, LT33-74A, which comes from Starfire Systems as a concentrate, was diluted into 8 parts hexane to 1 part LT33-74A by weight. The solution was painted on the surfaces of the part, allowed to air-dry for a few hours, and then a second coating was painted on. The solution has a very low viscosity and readily penetrated into the part. The part was then set on graphite rods and the fiber interface coating was pyrolyzed in a nitrogen atmosphere at about 850° C. via a slow temperature ramp at about 3° C. per minute. It will be apparent that the interface coating pyrolysis operation may occur at different temperatures and for different lengths of time depending on various factors including but not limited to the furnace design, pyrolysis environment, part specification, and interface coating used.

Referring now to operation 110, in accordance with an embodiment of the present invention, a pre-ceramic polymer is applied to the carbonized part, and the SiC matrix is built through cycles of polymer infiltration and pyrolysis (PIP) performed in a high-temperature furnace, once again either in an inert atmosphere or vacuum environment. The pre-ceramic polymer is designed to be applied with low viscosity but have a high yield. The yield may be improved with the addition of suspended particles of finely ground SiC (although the additive may inhibit thorough wicking of the polymer because outside pores may be sealed prior to the interior being free of voids). Advantageously, the pre-ceramic polymer may cure by low temperature thermal cross-linking, thereby lowering process temperatures. Polymers also allow for control over materials chemistry.

Applicable pre-ceramic polymers are commercially available from different vendors, including but not limited to the allylhydridopolycarbosilane (AHPCS) pre-ceramic polymer from Starfire Systems, Inc. of Malta, N.Y. Two forms of the AHPCS pre-ceramic polymer may be used: (1) a pure form of the polymer; and (2) a pre-mixed slurry with SiC powder added to the AHPCS pre-ceramic polymer ("AHPCS+SiC slurry"). In one example, the slurry may include: Starfire AHPCS with 10% by volume α-SiC powder (0.6 µm, H.C. Starck UF15); and wetting agents of 1% by mass tetrahydrofuran and 0.1% by mass polyglycol or ethylene glycol. SiC powder is vacuum dried or de-aerated before mixing. Mixing is accomplished in a "ball" mill with either alumina or zirconia balls.

In one experiment, the part was infiltrated with pre-ceramic polymer in a first cycle (cycle #1) using vacuum infusion. The part was placed in a vacuum bag and then premixed AHPCS+SiC slurry was allowed to flow through the bag at room temperature. It is noted that for some applications, raising the temperature of the slurry may aid infiltration. The pyrolysis run for the first cycle was performed in a HITCO ABAR furnace at between about 1000° C. and about 2000° C. in an atmosphere of nitrogen gas. Weight gain for the part after the first cycle was about 13%.

A second cycle (cycle #2) of the experiment included another infiltration of AHPCS+SiC slurry. The slurry was painted on both sides of each panel and allowed to sit and soak through for at least one hour. The pyrolysis run for cycle #2 was done in the HITCO ABAR furnace at about 1000° C. in an atmosphere of nitrogen gas. Weight gain for the part after the second cycle was about 7%.

Cycles three through nine (cycle #3-cycle #9) were provided in the experiment to infiltrate pure AHPCS polymer (i.e., a slurry was not used). Slurry was not used for these runs to prevent closing of the pores at the surfaces before the interior sections were made fully dense. The pyrolysis runs were performed in the HITCO ABAR furnace, all at about 1000° C. The incremental weight gain decreased from 7% to 1% by the ninth cycle.

Two more polymer infiltration and pyrolysis (PIP) cycles of pure pre-ceramic polymer were performed to provide a seal coating on the part. The pyrolysis run for both seal coats was done in the HITCO ABAR furnace at about 850° C. in an atmosphere of nitrogen gas. In the experiment, the total weight gain of the part due to PIP infiltration was about 55%, and the final average density of the part was about 1.77 g/cc.

At decision block 112, a decision is made to continue or stop PIP infiltration. If the decision is yes, PIP infiltration of the pre-ceramic polymer is continued. If the decision is no, PIP is ended and the part is either completed or processed further, for example by machining. In one example, PIP infiltration may be performed until the weight gained between cycles decreases to about 1% or another specified threshold.

A variety of parts may be fabricated for use in a variety of industries, all of which are within the scope of the present invention. In one example, large scale ceramic matrix composite (CMC) structures, such as nozzle shells, combustion chambers, and other vehicle components like leading edge components and control surfaces, may be fabricated for the aerospace industry. In a further example, a 60,000 lb-f thrust CMC booster-subscale nozzle, which has dimensions of 20" diameter×18" height, ultimate strength between about 40 ksi to about 47 ksi, and inter-laminar shear strengths as high as about 3 ksi, has been fabricated using the present invention.

Advantageously, the present invention does not use CVD reactors but instead allows for processing materials using existing autoclaves and inert furnaces, thereby improving fabrication scale up to large parts, processing cost, and processing time. With lower part counts, part joining and sealing issues are also reduced or eliminated with the present invention.

Embodiments described above illustrate but do not limit the invention. It should also be understood that numerous modifications and variations are possible in accordance with the principles of the present invention. Accordingly, the scope of the invention is defined only by the following claims.

We claim:

1. A method of fabricating a ceramic matrix composite structure, comprising:
    laying-up a carbon/carbon (C/C) pre-impregnated (prepreg) fabric on a tool;
    curing the C/C prepreg fabric to provide a cured material consisting of resin char and carbon black;
    adding carbon nano-structures to the resin char;
    carbonizing the cured material to provide a carbonized reinforcement part;
    applying a pre-ceramic polymer to the carbonized reinforcement part; and
    pyrolyzing the applied pre-ceramic polymer to fabricate a ceramic matrix composite structure.

2. The method of claim 1, wherein the prepreg fabric is laid-up to a desired thickness.

3. The method of claim 1, wherein the prepreg fabric is cross-linked in an autoclave.

4. The method of claim 1, wherein the cured material is carbonized in a furnace to a first density.

5. The method of claim 4, wherein the first density is between about 65% and about 75% of the ceramic matrix composite structure density.

6. The method of claim 4, wherein the ceramic matrix composite structure has a higher density than the first density.

7. The method of claim 1, wherein the cured material is carbonized to remove organic material from the prepreg fabric.

8. The method of claim 1, wherein the pre-ceramic polymer includes allylhydridopolycarbosilane.

9. The method of claim 1, wherein the pre-ceramic polymer is pyrolyzed in a furnace.

10. The method of claim 1, wherein the pre-ceramic polymer is pyrolyzed at a temperature between about 1000° C. and about 2000° C.

11. The method of claim 1, wherein the pre-ceramic polymer is applied as a slurry of SiC powder and liquid polymer precursor.

12. The method of claim 1, wherein the ceramic matrix composite structure includes a matrix selected from the group consisting of SiC, HfC, $Si_3N_4$, ZrC, $HfB_2$, and mixtures thereof.

13. The method of claim 1, further comprising applying at least one pre-ceramic polymer fiber interface coating to the carbonized reinforcement part prior to applying the pre-ceramic polymer.

14. The method of claim 1, wherein the carbon nano-structures comprise carbon nano-tubes.

15. A method of fabricating a ceramic matrix composite structure, comprising:
    laying-up a carbon/carbon (C/C) pre-impregnated (prepreg) fabric on a tool;
    curing the C/C prepreg fabric to provide a cured material consisting of resin char and carbon black;
    adding carbon nano-structures to the resin char;
    carbonizing the cured material to provide a carbonized reinforcement part having a first density;
    applying a pre-ceramic polymer to the carbonized reinforcement part, the pre-ceramic polymer including a compound selected from the group consisting of HfC, ZrC, and $HfB_2$;
    pyrolyzing the pre-ceramic polymer; and
    cycling through the operations of applying and pyrolyzing the pre-ceramic polymer to fabricate a ceramic matrix composite structure having a second density higher than the first density.

16. The method of claim 15, wherein the first density is between about 65% and about 75% of the ceramic matrix composite structure density.

17. The method of claim 15, wherein the pre-ceramic polymer matrix includes allylhydridopolycarbosilane.

18. A method of fabricating a ceramic matrix composite structure, comprising:
    laying-up a carbon/carbon (C/C) pre-impregnated (prepreg) fabric on a tool;
    curing the C/C prepreg fabric in an autoclave including compression by vacuum bagging to provide a cured material consisting of resin char and carbon black;
    adding carbon nano-structures to the resin char;
    carbonizing the cured material to provide a carbonized reinforcement part having a first density in an inert atmosphere furnace;
    applying a pre-ceramic polymer fiber interface coating to the carbonized reinforcement part;
    applying a pre-ceramic polymer to the pre-ceramic polymer fiber interface coating, the pre-ceramic polymer including a compound selected from the group consisting of HfC, ZrC, and $HfB_2$; and
    cycling through the operations of applying and pyrolyzing the pre-ceramic polymer to fabricate a ceramic matrix composite structure having a second density higher than the first density.

19. The method of claim 18, wherein the first density is between about 65% and about 75% of the ceramic matrix composite structure density.

20. The method of claim 18, wherein the pre-ceramic polymer includes allylhydridopolycarbosilane.

* * * * *